H. S. MUSTIN.
CLUTCH MECHANISM.
APPLICATION FILED DEC. 6, 1909.

1,015,394.

Patented Jan. 23, 1912.

2 SHEETS—SHEET 1.

Witnesses:
Charles J. Schmitt.
Emmett W. Kilcran.

Inventor:
Herbert S. Mustin
By Offield, Towle, Graves & Offield,
Attys.

H. S. MUSTIN.
CLUTCH MECHANISM.
APPLICATION FILED DEC. 6, 1909.
1,015,394.
Patented Jan. 23, 1912.
2 SHEETS—SHEET 2.
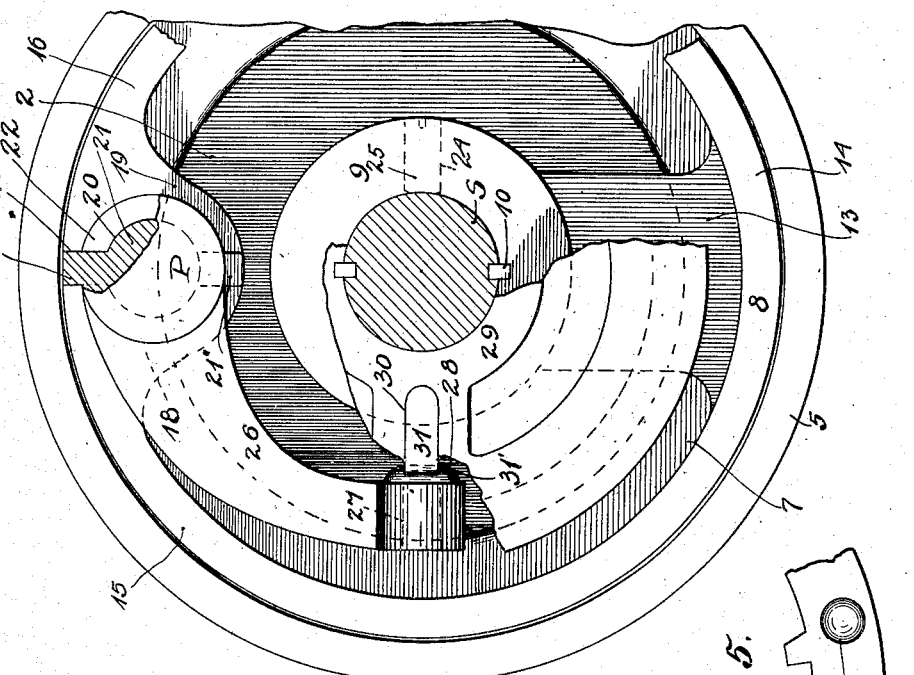
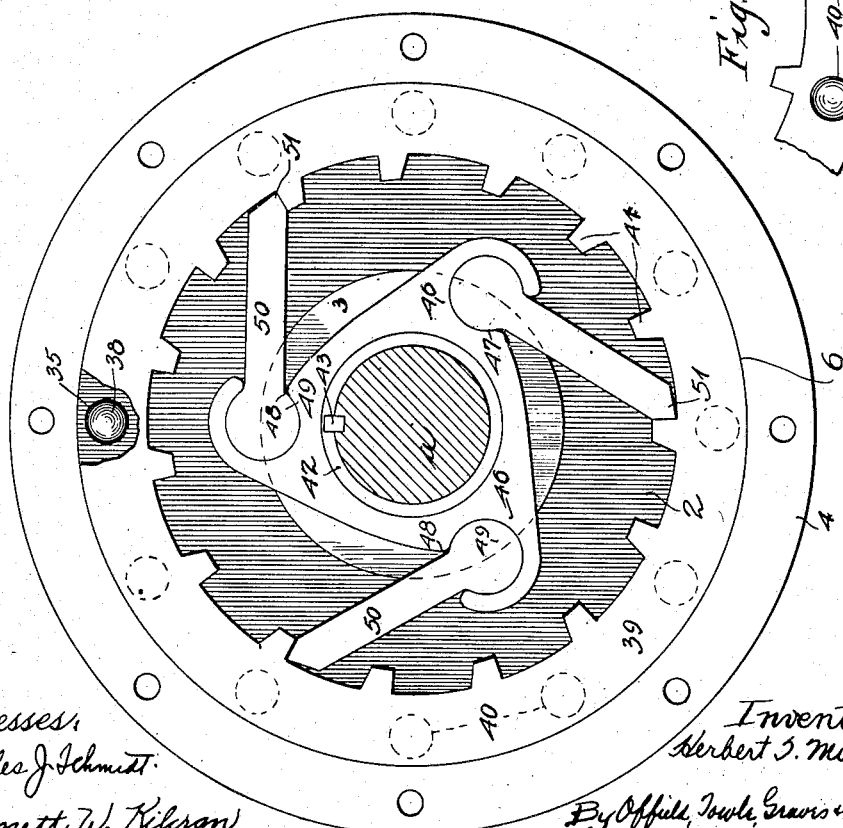
Witnesses:
Charles J. Schmidt.
Emmett W. Kelican.
Inventor:
Herbert S. Mustin.
By Offield, Towle, Graves & Offield
Attys.

UNITED STATES PATENT OFFICE.

HERBERT S. MUSTIN, OF CHICAGO, ILLINOIS, ASSIGNOR TO THE AUSTIN MANUFACTURING COMPANY, OF CHICAGO, ILLINOIS, A CORPORATION OF ILLINOIS.

CLUTCH MECHANISM.

1,015,394.   Specification of Letters Patent.   Patented Jan. 23, 1912.

Application filed December 6, 1909. Serial No. 531,528.

*To all whom it may concern:*

Be it known that I, HERBERT S. MUSTIN, a resident of Chicago, in the county of Cook and State of Illinois, have invented certain new and useful Improvements in Clutch Mechanism, of which the following is a full, clear, and precise specification.

My invention relates to clutch mechanism for connecting driving mechanism with parts to be driven.

My invention is particularly adaptable for connecting a continuously driving member with parts to be driven, but which parts to be driven are apt to be suddenly stopped whereafter further drive thereof would result in injury, as for example, in power driven lawn mowers where a driving engine operates continuously and the cutting knives are apt to meet with stones and other obstructions so that further positive drive of the knives would result in injury thereto. In such machines it is also desirable that the knives be driven only in the cutting direction to be free to rotate in the cutting direction due to their inertia after slowing up or stopping of the machine.

Among the salient objects of my invention, therefore, are to provide clutch mechanism in which the various associated parts are not positively connected together; to provide an improved arrangement in which the source has yielding and preferably friction engagement with the clutch mechanism; to provide an improved arrangement in which the driven member has connection in the clutch mechanism to be driven positively only in one direction and to be free to continue in this direction due to its own inertia after slowing up or stopping of the machine; to provide an improved arrangement in which the driven parts have yielding friction connection in the clutch mechanism so that the driving parts may operate independently of the driven parts if the driven parts are suddenly stopped, thereby to prevent injury to the driven parts; and in general to provide a simplified construction which can be easily assembled or taken apart and which can be easily taken care of, particularly in the matter of lubrication.

In the following specification and accompanying drawings my invention is plainly described and illustrated.

Figure 1:
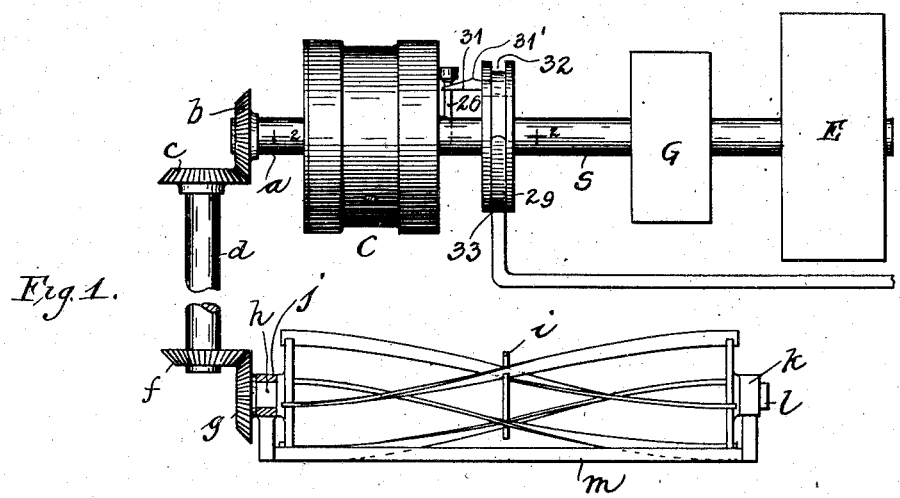
Figure 2:
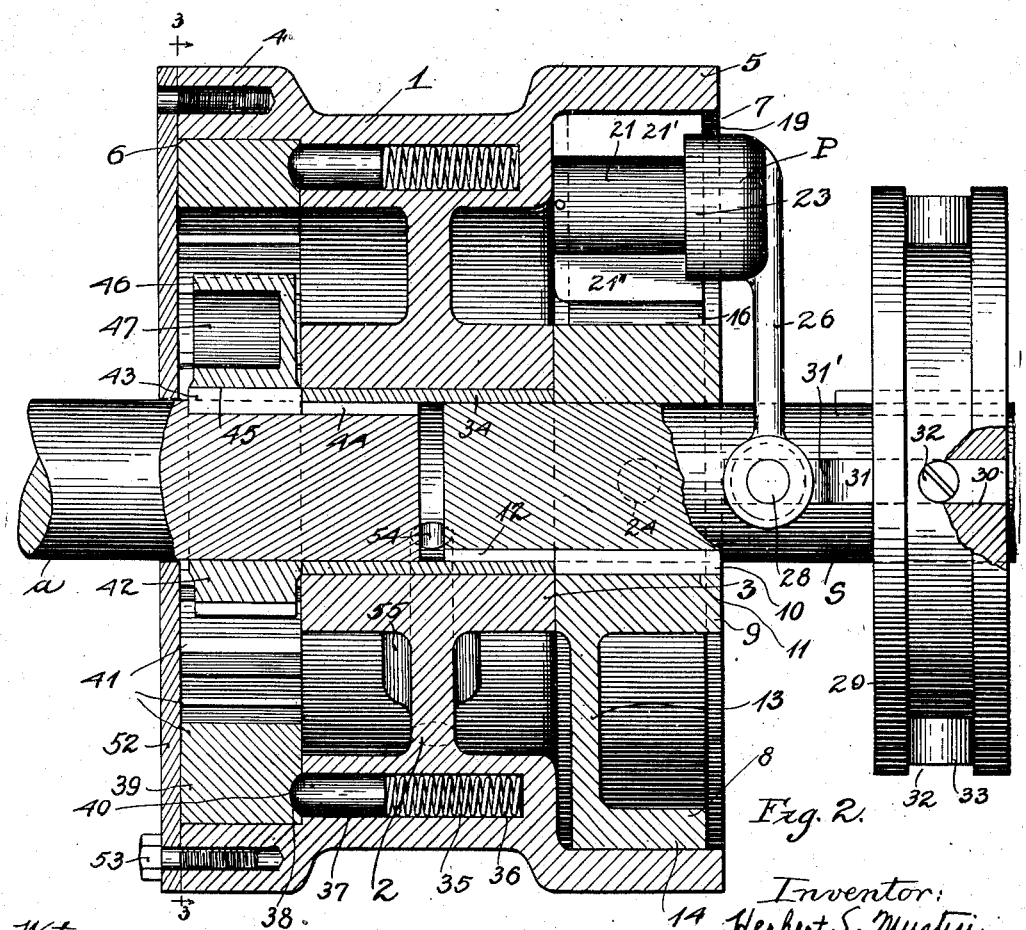

In the drawings Figure 1 is a more or less diagrammatic view showing my improved clutch mechanism interposed between the driving engine and mower blades, Fig. 2 is an enlarged sectional view taken on plane 2—2, Fig. 1, Fig. 3 is an end view of the clutch mechanism taken from plane 3—3, Fig. 2, Fig. 4 is a view of the other end of the clutch mechanism, and Fig. 5 is a fragmentary view of an annular gear forming part of the differential mechanism.

In Fig. 1 E represents the driving engine, C represents as a whole my improved clutch mechanism connected with the engine shaft S in which may be included suitable speed changing mechanism G. The driven shaft section $a$ extending from the clutch mechanism is shown as carrying a bevel pinion $b$ meshing with a companion pinion $c$ carried at one end of a shaft $d$ whose other end carries a bevel pinion $f$ meshing with a bevel pinion $g$ connected with trunnion $h$ extending from a lower rotary blade frame $i$. A bearing frame $j$ journaling trunnion $h$ and a bearing frame $k$ journaling the opposite trunnion $l$ support a knife bar $m$.

In the remaining figures the construction of the clutch mechanism is shown in detail. This clutch mechanism comprises a substantially cylindrical body part 1 having a central web 2 carrying the axial hub 3. At the left and right ends respectively of the body frame are the flanges 4 and 5 surrounding the cylindrical pockets 6 and 7 respectively. In Figs. 2 and 4 is shown an expanding clutch ring 8 having a hub 9 for receiving the drive shaft section S, the hub being secured to the shaft by means of a key 10 engaging in keyways 11 and 12 of the hub and shaft respectively. Extending from the inner end of the hub in a radial direction is a spoke 13 connecting with the rim 14 along its central part, the ends 15 and 16 at a point diametrically opposite the spoke 14 being separated by a gap 17 and being enlarged to form cylindrical sections 18 and 19 between which a drill is run to form a cylindrical axial passageway 20 for receiving the cylindrical hub 21 of expansion plug P. (See Fig. 2). The outer faces of the sections 18 and 19 are counter-sunk to leave a pocket 22 for receiving the head 23 of the expansion plug. The hub has also a threaded radial opening 24 for receiving a set screw 25 for securing the expansion ring on shaft S after longitudinal adjustment thereon. The expansion plug has the radial arm 26 whose end has a threaded passageway 27 parallel to shaft S and for receiving a cam pin 28. Keyed to shaft S to slide thereon is a collar 29 having the longitudinal opening 30 in which is secured a wedge 31 by set screw 32, this wedge extending toward the arm 26 in the plane of the cam pin 28. The wedge has the upper cam ridge 31', as shown. The peripheral groove 32 on the collar receives a fork 33 operable by the operator to slide the collar along the shaft S. The plug hub 21 has the radial extensions 21' and 21" which engage in the gap 17. When cam ridge 31' is withdrawn from cam pin 28, the ends 15 and 16 of the expansion ring are together and free from the clutch frame 1. However, when collar 29 is slid inwardly, the cam ridge engages the cam pin to swing arm 26 and to rotate hub 21 to swing extensions 21' and 21" in the gap 17, thereby spreading apart ends 15 and 16 to frictionally clamp the expansion ring to flange 5 so that the clutch body will rotate with the engine shaft. The end of shaft S extends a distance into hub 3 and is thereby held in perfect axial alinement, hub 3 being provided with a bushing 34 to reduce friction. The engine is preferably of the explosive type and the shaft S will, therefore, rotate continuously.

Referring to Figs. 2 and 3, the body part 1 has a plurality of longitudinal cylindrical pockets 35 equidistant from the axial center, four such pockets being shown spaced ninety degrees apart. In each pocket is a compression spring 36 for driving outwardly a clutch pin 37 having a rounded head 38. An internal gear annulus 39 fits loosely in pocket 6 and in its inner face has circular concave notches 40 for receiving the rounded ends of pins 37, twelve equally spaced notches being provided as shown, although more could be provided. The gear annulus has the inner ratchet teeth 41 extending about the entire inner periphery, this gear annulus forming one member of differential mechanism whose other member is also shown in Figs. 2 and 3. This member comprises a central hub 42 for receiving the driven shaft a, a key 43 engaging in keyways 44 and 45 of the shaft and hub respectively to lock the differential member to the shaft. The hub has a number of equally spaced radial extensions 46, three being shown, and each extension is provided with a cylindrical pocket 47 extending parallel with the axis of the member, each pocket having an outlet passage 48 extending substantially at right angles to the radial plane passing through the axes of the hub and the pocket. The pockets receive the cylindrical heads 49 of pawls 50 whose ends 51 coöperate with the ratchet teeth of the annulus 39, as shown in Fig. 2, the outlets 48 being sufficiently wide to allow rotational movement of the pawls. Referring to Fig. 3, if the gear annulus rotates in a counterclockwise direction its teeth will be engaged by the pawls so that the pawl frame and the shaft a rotate with the annulus. If the annulus rotates in a clockwise direction or the shaft a rotates faster than the annulus the pawls will drag over the teeth. The differential members will be retained in pocket 6 by the cover 52 secured by bolts 53 to flange 4. During normal operation of the clutch the spring pressed clutch teeth 37 will retain their ends in notches 40 and the annulus will be carried with the clutch body in counterclockwise direction to engage the pawls to drive the clutch member 42 and shaft a in counterclockwise direction. If, however, for any reason shaft a is stopped, the annulus will stop and the clutch pins will click noisily over the notches to give warning to the operator who will stop the clutch body until the impediment has been removed. Also, if the clutch body is stopped or slows down the inertia of the driven mechanism can rotate the differential member 42 independently of the annulus and clutch body. The inner end of shaft a extends into bushing 42 of hub 3 and is held in perfect alinement. The bearing surfaces of the shafts and the bushing 40 can be kept well lubricated by oil applied in the oil well 54 extending radially through hub 3 and enlargement 55 on web 2, the well terminating at the outside of the body part 1, as best shown in Fig. 1, and provided with a threaded plug 56.

The clutch mechanism of my invention comprises a minimum number of simple parts arranged in simple yet substantial manner. Access can be readily had to all the parts within the clutch frame and none of the parts are positively connected together. By removing cover 52 the annulus will be pushed outwardly by the force of springs 35, and no difficulty will be experienced in replacing the pins and the annulus. When the pins are inserted the annulus is applied and the pins and annulus are carried into proper position when the screws 53 are drawn up to secure the cover in place. When the cover is removed the pawls can be readily extracted and the differential member 42 withdrawn. The expansion ring and the expansion controlling parts can also be readily disconnected and assembled. Efficient oiling can be provided for from the outside of the clutch mechanism without disturbing the clutch parts.

Having thus described my invention and its desirable features, I claim the following:

1. In a clutch, the combination of a body part substantially in the form of a cylindrical shell, a gear journaled on and within said shell, yieldable clutch mechanism connecting said gear with said shell, means for confining the gear within the shell, driving means for the shell, and parts to be driven associated with said gear within said shell.

2. In combination, a substantially cylindrical shell, an annular internal gear journaled on and within said shell, means yieldably connecting said gear with said shell to rotate therewith, means for rotating said shell, and mechanism to be driven associated with said gear within said shell.

3. In combination, a substantially cylindrical shell having an annular pocket at one end, an annulus in said pocket, a cover engaging the end of the shell adjacent said pocket and forming with said pocket a bearing for said annulus, clutch mechanism connecting said annulus with said shell, said annulus having internal teeth, and a member to be driven mounted within said annulus and having extensions for engaging with said annulus teeth.

4. In combination, a body part substantially in the form of a cylindrical shell, the inner side of said shell having pockets extending substantially parallel with the shell axis, friction clutch pins in said pockets, springs tending to force said pins from said pockets, a gear within the shell adjacent the outlets of said pockets and having grooves for receiving the ends of the pins, a cover engaging one end of the shell to lock the gear within the shell and to hold it against the pin ends, driving means for said shell, and parts to be driven associated with said gear within said shell.

5. In combination, a substantially cylindrical shell having a central annular inner projection provided with pockets extending in the direction of the shell axis, pins in said pockets, compression springs in said pockets tending to force the ends of the pins beyond the pocket outlets, an annular internal gear having notches in one face for receiving the projecting ends of the pins, means for confining the gear within said shell and for holding it adjacent said projection to maintain engagement between the gear and the pins, means for rotating the shell, and mechanism to be driven associated with said gear.

6. In combination, a substantially cylindrical shell having a central inner annular projection, said projection having pockets extending in the direction of the shell axis, clutch pins in said pockets having rounded outer ends, compression springs within the pockets tending to force the rounded ends of the pins beyond the pocket outlets, an annulus having concave slots in one face for receiving the rounded ends of the pins, means for holding said annulus toward said projection to maintain engagement between said grooves and said pins, ratchet teeth on the inner face of said annulus, means for rotating said shell, a shaft to be driven extending axially into said shell, a pawl frame carried on said shaft, and pawls pivoted on said pawl frame for coöperating with said ratchet teeth.

7. In combination, a substantially cylindrical body part having a central diametral wall leaving cylindrical compartments at the ends of the body part, there being pockets along the outer part of said wall and extending from one of said cylindrical compartments in the direction of the body part axis, clutch pins in said pockets having rounded outer ends, compression springs within the pockets tending to force the ends of the pins beyond the pocket outlets, an annulus having concave grooves in one face for receiving the rounded ends of the pins, means for holding said annulus adjacent said wall whereby the rounded ends of the spring pressed pins may enter said grooves, said wall having an axial cylindrical bearing passageway, a shaft extending through said compartment and into said passageway, a member to be driven mounted on said shaft within said body part and provided with teeth, said annulus having internal teeth for coöperating with the teeth of the part to be driven, a drive shaft extending through the other compartment and into said passageway, and a drive member in said other compartment connected with said drive shaft and adapted for driving connection with said body part.

8. In combination, a substantially cylindrical body part having a central diametral wall leaving cylindrical compartments at the ends of the body part, there being pockets along the outer part of said wall and extending from one of said cylindrical compartments in the direction of the body part axis, clutch pins in said pockets having rounded outer ends, compression springs within the pockets tending to force the ends of the pins beyond the pocket outlets, an annulus having concave grooves in one face for receiving the rounded ends of the pins, means for holding said annulus adjacent said wall whereby the rounded ends of the spring pressed pins may enter said grooves, said wall having an axial cylindrical bearing passageway, a shaft extending through said compartment and into said passageway, a member to be driven mounted on said shaft within said body part and provided with teeth, said annulus having internal teeth for coöperating with the teeth of the part to be driven, a drive shaft extending through the other compartment and into said passageway, and a drive member in said other compartment connected with said drive shaft and adapted for frictional driving engagement with said body part.

9. In combination, a substantially cylindrical wall having a lateral peripheral flange forming a cylindrical compartment adjacent said wall, said wall having pockets arranged near its periphery, said pockets being substantially parallel with the axis of said wall and opening into said compartment, friction pins in said pockets having rounded outer ends, compression springs within said pockets tending to project said pins into said compartment, an annulus having concave grooves in one face for receiving the rounded ends of said pins, means for confining said annulus in said compartment and against said pins, a shaft to be driven extending axially through said compartment and journaled in said wall, a pawl frame within said compartment secured to said shaft, ratchet teeth projecting from the inner face of said annulus, pawls pivoted to said pawl frame for coöperating with said ratchet teeth, and means for rotating said wall.

10. In combination, a substantially cylindrical wall having a lateral peripheral flange forming a cylindrical compartment adjacent said wall, said wall being provided with pockets near its periphery extending in axial direction and opening into said compartment, friction pins in said pockets having rounded outer ends, springs in said pockets tending to project said pins into said compartment, an annulus having concave grooves in one face for receiving the rounded ends of said pins, means secured to said flange for confining said annulus in said compartment and for holding said annulus against said spring actuated pins, a shaft to be driven extending axially through said compartment and journaled in said wall, a pawl frame within said compartment secured to said shaft, said pawl frame having cylindrical axially extending pockets, pawls having cylindrical heads pivoted in said pockets and extending therefrom toward said annulus, ratchet teeth on the inner face of said annulus for coöperating with the pawl ends, and driving means for rotating said wall.

11. In combination, a substantially cylindrical wall having a lateral peripheral flange forming a cylindrical compartment adjacent said wall, said wall being provided with pockets near its periphery extending in axial direction and opening into said compartment, friction pins in said pockets having rounded outer ends, springs in said pockets tending to project said pins into said compartment, an annulus having concave grooves in one face for receiving the rounded ends of said pins, means secured to said flange for confining said annulus in said compartment and for holding said annulus against said spring actuated pins, a shaft to be driven extending axially through said compartment and journaled in said wall, a pawl frame within said compartment secured to said shaft, said pawl frame having cylindrical axially extending pockets, pawls having cylindrical heads pivoted in said pockets and extending therefrom toward said annulus, ratchet teeth on the inner face of said annulus for coöperating with the pawl ends, and driving means adapted for frictional driving engagement with said wall.

In witness whereof, I hereunto subscribe my name this 30th day of November, A. D. 1909.

HERBERT S. MUSTIN.

Witnesses:
CHARLES J. SCHMIDT,
NELLIE B. DEARBORN.